(12) United States Patent
Suzuki

(10) Patent No.: US 12,286,250 B2
(45) Date of Patent: Apr. 29, 2025

(54) FLYING VEHICLE

(71) Applicant: AERONEXT INC., Shibuya-ku (JP)

(72) Inventor: Yoichi Suzuki, Shibuya-ku (JP)

(73) Assignee: AERONEXT INC., Shibuya-ku (JP)

( * ) Notice: Subject to any disclaimer, the term of this patent is extended or adjusted under 35 U.S.C. 154(b) by 28 days.

(21) Appl. No.: 18/042,446

(22) PCT Filed: Sep. 7, 2020

(86) PCT No.: PCT/JP2020/033761
§ 371 (c)(1),
(2) Date: Feb. 21, 2023

(87) PCT Pub. No.: WO2022/049764
PCT Pub. Date: Mar. 10, 2022

(65) Prior Publication Data
US 2023/0331407 A1    Oct. 19, 2023

(51) Int. Cl.
| | | |
|---|---|---|
| *B64U 10/20* | (2023.01) | |
| *B64C 3/42* | (2006.01) | |
| *B64C 27/26* | (2006.01) | |
| *B64C 29/00* | (2006.01) | |
| *B64C 39/02* | (2023.01) | |

(Continued)

(52) U.S. Cl.
CPC ............ *B64U 10/20* (2023.01); *B64C 3/42* (2013.01); *B64C 27/26* (2013.01); *B64C 29/0033* (2013.01); *B64C 39/02* (2013.01); *B64D 45/04* (2013.01); *B64U 50/13* (2023.01)

(58) Field of Classification Search
CPC .... B64U 10/20; B64U 50/13; B64U 2101/30; B64U 10/14; B64U 30/12; B64U 10/25; B64C 3/42; B64C 27/26; B64C 29/0033; B64C 27/28; B64C 39/02; B64D 45/04
See application file for complete search history.

(56) References Cited

U.S. PATENT DOCUMENTS 1,786,545 A * 12/1930 Noeggerath ........ B64C 29/0033
244/7 C
2,230,370 A * 2/1941 Baynes ............... B64C 29/0033
244/7 R (Continued)

FOREIGN PATENT DOCUMENTS

| JP | H0577789 A | 3/1993 |
|---|---|---|
| JP | 2009078745 A | 4/2009 |

(Continued)

OTHER PUBLICATIONS

International Search Report dated Nov. 10, 2020 for International Application No. PCT/JP2020/033761.

(Continued)

*Primary Examiner* — Medhat Badawi

(57) ABSTRACT

A flying vehicle with a flight part connected to a plurality of rotor wing parts and a main wing, wherein the main wing is configured such that the lift produced by the main wing during landing is reduced compared to the lift produced by the main wing during cruising. Furthermore, the main wing is fixed at a forward tilt with respect to the flight part. Furthermore, the rotor wing is connected at an angle that produces propulsion and lift during cruise. Furthermore, the rotor blades are connected at an angle that generates propulsive force during cruise.

5 Claims, 18 Drawing Sheets

(51) Int. Cl.
*B64D 45/04* (2006.01)
*B64U 50/13* (2023.01)

(56) References Cited

U.S. PATENT DOCUMENTS

| | | | | |
|---|---|---|---|---|
| 2,437,330 | A * | 3/1948 | Mullgardt | B64C 29/0033 244/6 |
| 2,989,269 | A * | 6/1961 | John | B64C 29/0033 244/12.3 |
| 3,117,745 | A * | 1/1964 | Ellis, III | B64C 27/54 244/7 C |
| 3,159,361 | A * | 12/1964 | Weiland | B60V 1/14 180/117 |
| 3,181,810 | A * | 5/1965 | Olson | B64C 29/0033 244/66 |
| 3,592,412 | A * | 7/1971 | Glatfelter | B64C 29/0033 416/142 |
| 3,797,783 | A * | 3/1974 | Kisovec | B64C 29/0033 244/7 A |
| 4,149,688 | A * | 4/1979 | Miller, Jr. | B64C 29/0033 244/12.4 |
| 4,982,914 | A * | 1/1991 | Eickmann | B64C 11/28 244/54 |
| 6,292,491 | B1 * | 9/2001 | Sharper | H04Q 11/0478 370/229 |
| 7,150,429 | B2 * | 12/2006 | Kusic | B64C 29/0083 244/17.23 |
| 8,152,096 | B2 * | 4/2012 | Smith | B64C 29/0033 244/12.4 |
| 8,496,200 | B2 * | 7/2013 | Yoeli | B64C 29/0025 244/23 B |
| 8,733,690 | B2 * | 5/2014 | Bevirt | B64C 29/0033 244/17.23 |
| 9,120,560 | B1 * | 9/2015 | Armer | B64C 27/26 |
| 9,187,174 | B2 * | 11/2015 | Shaw | B64C 27/28 |
| 9,475,585 | B2 * | 10/2016 | Hong | B64D 35/00 |
| 9,481,457 | B2 * | 11/2016 | Alber | B64U 10/20 |
| 9,499,263 | B2 * | 11/2016 | Youngblood | B64U 30/297 |
| 9,714,090 | B2 | 7/2017 | Frolov | |
| 10,131,426 | B2 | 11/2018 | Judas | |
| 10,252,796 | B2 * | 4/2019 | Reichert | B64C 29/0033 |
| 10,252,797 | B2 * | 4/2019 | Vondrell | B64C 3/32 |
| 10,301,016 | B1 * | 5/2019 | Bondarev | B64C 15/12 |
| 10,370,082 | B2 * | 8/2019 | Har | B64C 3/38 |
| 10,384,773 | B2 * | 8/2019 | Vondrell | B64D 27/24 |
| 10,384,774 | B2 * | 8/2019 | Vondrell | B64C 27/28 |
| 10,392,106 | B2 * | 8/2019 | Vondrell | B64D 27/24 |
| 10,392,107 | B2 * | 8/2019 | Har | B64D 27/24 |
| D858,352 | S * | 9/2019 | Gan | D12/16.1 |
| D858,353 | S * | 9/2019 | Gan | D12/16.1 |
| D860,047 | S * | 9/2019 | Gan | D12/16.1 |
| 10,399,673 | B1 * | 9/2019 | Roop | B64C 3/30 |
| 10,421,540 | B1 * | 9/2019 | Koelzer | B64C 29/0033 |
| D862,285 | S * | 10/2019 | Tompkin | D12/16.1 |
| D864,022 | S * | 10/2019 | Gan | D12/328 |
| D864,082 | S * | 10/2019 | Zhou | D12/328 |
| D864,083 | S * | 10/2019 | Zhou | D12/328 |
| D870,638 | S * | 12/2019 | Kuanliang | D12/328 |
| D873,175 | S * | 1/2020 | Li | D12/328 |
| 10,696,391 | B2 * | 6/2020 | Ewing | B64C 29/0075 |
| 10,710,713 | B2 * | 7/2020 | Mia | B64C 29/0025 |
| 10,745,125 | B2 * | 8/2020 | Kondo | B64C 37/00 |
| 10,752,352 | B2 * | 8/2020 | Brand | B64C 27/54 |
| 10,836,481 | B2 * | 11/2020 | Groninga | B64C 39/08 |
| D906,170 | S * | 12/2020 | Thompson | D12/16.1 |
| 10,906,664 | B2 * | 2/2021 | Ljung | B64D 35/04 |
| 10,974,815 | B2 * | 4/2021 | Reichensperger | B64C 11/46 |
| 10,981,661 | B2 * | 4/2021 | Oldroyd | B64C 39/024 |
| 10,988,248 | B2 * | 4/2021 | Mikić | B64U 50/19 |
| 11,059,598 | B2 * | 7/2021 | Arkus | B64C 1/063 |
| 11,084,576 | B2 * | 8/2021 | Caldwell | B64C 27/00 |
| 11,230,384 | B2 * | 1/2022 | Lynn | B60L 1/02 |
| 11,323,214 | B2 * | 5/2022 | MacAfee | H04L 1/08 |
| 11,370,323 | B2 * | 6/2022 | Fauri | B60L 58/18 |
| 11,407,510 | B2 * | 8/2022 | Mikic | G05D 1/652 |
| 11,447,246 | B2 * | 9/2022 | Kunz | B64U 30/40 |
| 11,511,854 | B2 * | 11/2022 | Baity | B64U 30/297 |
| 11,530,028 | B1 * | 12/2022 | Wiegman | B64C 13/04 |
| 11,554,855 | B2 * | 1/2023 | Brand | B64D 43/02 |
| 11,554,862 | B2 * | 1/2023 | Kiesewetter | B64C 27/28 |
| 11,603,193 | B2 * | 3/2023 | Kim | B64U 10/25 |
| 11,603,209 | B2 * | 3/2023 | Shang | B64D 31/02 |
| 11,618,338 | B2 * | 4/2023 | Bower | B60L 53/65 702/63 |
| 11,643,199 | B2 * | 5/2023 | Melo | B64C 29/0025 244/6 |
| 11,731,772 | B2 * | 8/2023 | Fenny | B64D 27/24 244/12.3 |
| 11,747,830 | B2 * | 9/2023 | Burghardt | G01C 21/16 701/4 |
| 11,772,773 | B2 * | 10/2023 | Tao | B64C 29/0033 244/6 |
| 11,780,572 | B2 * | 10/2023 | Mikic | B64C 27/26 244/6 |
| 11,787,537 | B2 * | 10/2023 | Sinha | B64C 29/0016 244/7 A |
| 11,820,499 | B1 * | 11/2023 | Beno | H02K 5/203 |
| 11,827,347 | B2 * | 11/2023 | Bevirt | B64C 29/0033 |
| 11,919,629 | B2 * | 3/2024 | Bartsch | B64U 30/297 |
| 11,919,631 | B2 * | 3/2024 | Bower | B64D 27/24 |
| 11,926,429 | B2 * | 3/2024 | Warbeck | B64C 29/0033 |
| 11,926,443 | B2 * | 3/2024 | Kastiel | B64U 30/20 |
| 2003/0062443 | A1 * | 4/2003 | Wagner | B64C 29/0025 244/12.3 |
| 2003/0094537 | A1 | 5/2003 | Austen-Brown | |
| 2004/0245374 | A1 * | 12/2004 | Morgan | B64C 29/0025 244/12.3 |
| 2005/0230519 | A1 * | 10/2005 | Hurley | B64C 29/0033 244/7 C |
| 2006/0151666 | A1 * | 7/2006 | VanderMey | B64C 29/0016 244/12.3 |
| 2007/0057113 | A1 * | 3/2007 | Parks | B64C 29/0041 244/12.5 |
| 2008/0001025 | A1 * | 1/2008 | Said | B64C 35/00 244/13 |
| 2009/0008499 | A1 * | 1/2009 | Shaw | B64C 27/52 244/17.23 |
| 2010/0301168 | A1 * | 12/2010 | Raposo | B64C 27/20 244/171.2 |
| 2011/0001020 | A1 * | 1/2011 | Forgac | B64C 29/0033 244/7 A |
| 2011/0042508 | A1 * | 2/2011 | Bevirt | B64C 15/00 244/75.1 |
| 2012/0234968 | A1 * | 9/2012 | Smith | B64C 27/82 244/12.3 |
| 2012/0261523 | A1 * | 10/2012 | Shaw | B64C 29/0033 244/7 R |
| 2012/0318908 | A1 * | 12/2012 | Morris | B64C 29/0033 244/6 |
| 2013/0020429 | A1 * | 1/2013 | Kroo | B64C 29/0025 244/6 |
| 2013/0062455 | A1 * | 3/2013 | Lugg | B64C 39/12 244/12.3 |
| 2015/0344136 | A1 * | 12/2015 | Dahlstrom | G05D 1/0866 239/722 |
| 2016/0114887 | A1 * | 4/2016 | Zhou | H04N 23/69 348/148 |
| 2017/0217587 | A1 * | 8/2017 | Goelet | A01G 15/00 |
| 2018/0354617 | A1 * | 12/2018 | Frolov | B64U 10/25 |
| 2019/0106207 | A1 * | 4/2019 | Park | B64C 27/28 |
| 2022/0089279 | A1 * | 3/2022 | Rosen | B64C 29/02 |
| 2023/0174225 | A1 * | 6/2023 | Hong | B64C 27/08 244/17.23 |
| 2023/0202652 | A1 * | 6/2023 | Convert | B64U 50/32 244/7 R |

(56) References Cited

U.S. PATENT DOCUMENTS

2023/0234703 A1\* 7/2023 Brown .................... B64C 11/04
                                                                     244/7 R
2023/0331407 A1\* 10/2023 Suzuki ................... B64U 10/25

FOREIGN PATENT DOCUMENTS

| JP | 2009234551 A | 10/2009 |
| JP | 2019018623 A | 2/2019 |

OTHER PUBLICATIONS

Supplementary European Search Report dated May 29, 2024 for European Patent Application No. 20952498.2.

\* cited by examiner

FLYING VEHICLE

TECHNICAL FIELD

The present invention relates to a flying vehicle.

BACKGROUND ART

In recent years, research and demonstration tests have been conducted for the practical application of services using flying vehicles such as unmanned and manned drones and unmanned aerial vehicles (UAVs) (hereinafter collectively referred to as "flying vehicles"). Flying vehicles with multiple rotor blades (hereinafter collectively referred to as "multicopters"), which are generally called multicopters, do not have fixed wings, so they must constantly generate lift by using their rotor blades, which is desirable to improve fuel efficiency.

In light of this situation, for example, in Patent Literature 1, in order to achieve both vertical takeoff and landing, and improved fuel efficiency, a multicopter mechanism and fixed wings are combined to use the rotor blades of the multicopter mechanism for vertical takeoff and landing and hovering, and the lift generated by the main wings for horizontal flight. Thus, VTOL airframes (hereinafter collectively referred to as "conventional airframes") have been developed with the aim of achieving both vertical takeoff and landing, and improved fuel efficiency.

PRIOR ART LIST

Patent Literature

[Patent Literature 1] U.S. Ser. No. 10/131,426B2

SUMMARY OF INVENTION

Technical Problem

However, the conventional aircraft as illustrated in FIGS. 25-27 are designed so that the wing 20 has an optimum angle of attack during horizontal flight, while the rotor blades and wing 20 are fixed to the frame at a constant angle relative to the frame, respectively. Therefore, as shown in FIGS. 25 and 26, the angle of attack of the wing 20 is greater in the landing attitude than in the horizontal flight attitude.

Thus, in the case of a configuration in which the main wings 20 have an angle of attack that generates lift in an environment where the wind is blowing with a headwind component at the time of landing, the flying vehicle may become unstable, and landing may be difficult. Depending on the strength of the wind, the flying vehicle may unintentionally move upward as the main wings 20 generate lift due to the wind by assuming a landing posture, which may interfere with the descent operation for landing. Flying vehicles with wings are generally equipped with a vertical tail wing to improve stability in the yaw direction. Flying vehicles that gain a weathercock stability effect from the vertical tail will attempt to face forward into the airflow, and the 20 main wings will be more likely to generate lift.

Therefore, an object of the present invention is to provide a flying vehicle that combines a multicopter mechanism and a main wing to achieve both vertical takeoff and landing and stable landing with improved fuel efficiency.

Technical Solution

According to the present invention, a flying vehicle is provided with a flight part connected to a plurality of rotor wing parts and a main wing, wherein the main wing is configured such that a lift force generated by the main wing during landing that is reduced compared to the lift force generated by the main wing during cruising.

Advantageous Effects

According to the present invention, it is possible to provide a flying vehicle that can achieve both vertical takeoff and landing and improve fuel efficiency, while also achieving a stable landing.

DETAILED DESCRIPTION OF THE EMBODIMENTS

Figure 1:
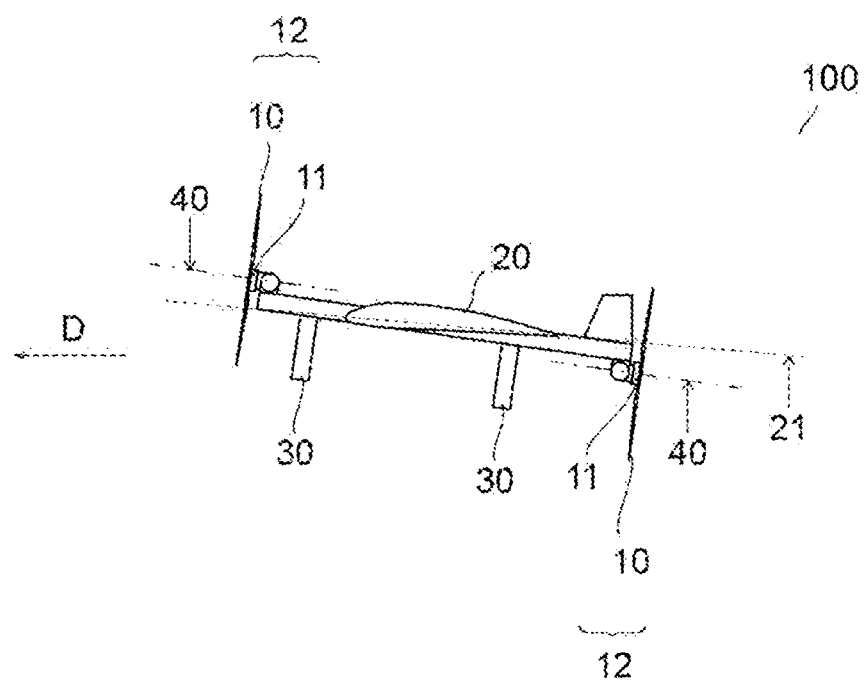
FIG. 1 is a conceptual view of the flying vehicle according to the invention in cruise mode, viewed from the side.
Figure 1:
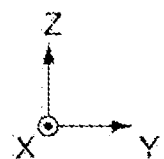

The contents of the embodiments of the present invention are listed and explained. An aircraft according to an embodiment of the present invention has the following configuration.

[Item 1]
A flying vehicle, comprising:
a plurality of rotary wing parts;
a main wing; and
a flying part connected thereto,
wherein the main wing is configured so that the lift generated by the main wing during landing is reduced compared to the lift generated by the main wing during cruise.

[Item 2]
The flying vehicle according to item 1,
wherein the main wing is fixed at a forward tilt to the flying part.

[Item 3]
The flying vehicle according to item 1,
wherein an angle of the rotary axis of the rotor blades is controlled so that the main wing tilt forward when landing than when cruising.

[Item 4]
The flying vehicle as in any one of items 1 to 3,
wherein the rotary wing is connected at an angle that generates propulsion and lift when cruising.

[Item 5]
The flying vehicle as in any one of items 1 to 3.
wherein the rotary wing is connected at an angle that generates propulsive force when cruising.

[Item 6]
The flying vehicle as in any one of items 1 to 5,
wherein The flying part is configured so that the rotary wings do not interfere with the flying part or the main wing during landing.

[Item 7]
The flying vehicle according to item 1,
wherein the main wing is connected to the flying part via the rotary axis,
wherein the main wing is configured to tilt forward about the rotary axis at an angle to the flying part when landing than when cruising.

[Item 8]
The flying vehicle according to item 7,
wherein the main wing is further connected to the flying part via a support member and a spring,
wherein the spring is configured to cause the main wing to tilt forward about the rotary axis at an angle relative to the flying part more than during cruising by releasing the support by the support member during landing.

[Item 9]
The flying vehicle as in any one of items 1 to 8,
wherein the main wing is configured to tilt forward or backward at an angle of attack that results in a stall in the event of an emergency crash.

[Item 10]
The flying vehicle as in any one of items 1 to 9,
wherein the flying vehicle is further provided with means to reduce the operating rate of fall in the event of an emergency crash.

[Item 11]
The flying vehicle as in any one of items 1 to 10,
wherein the main wing is further equipped with an additional moving surface that deploys above the main wing during landing.

[Item 12]
The flying vehicle as in any one of items 1 to 11,
wherein the flying vehicle is further equipped with a fan that produces an upward wake during landing.

DETAILED DESCRIPTION OF THE EMBODIMENTS

The flying vehicle according to embodiments of the invention will be described below with reference to the drawings. In the accompanying drawings, identical or similar elements are given identical or similar reference codes and names, and duplicate descriptions of identical or similar elements may be omitted in the description of each embodiment. The features shown in each embodiment are also applicable to other embodiments as long as they do not contradict each other.

Details of the First Embodiment

As shown in FIG. 1, the flying vehicle 100 is a flying vehicle capable of vertical takeoff and landing (VTOL). The flying vehicle 100 has a plurality of rotary wing parts 12 comprising at least a propeller 10, a motor 11, and other elements, and a main wing 20 for flying. The main wing 20 is connected to the flying part, which includes the rotary wing part 12 and the main body part 60. The flying vehicle 100 also has landing legs 30 that contact the ground when landing. The flying vehicle 100 shown in the figure is depicted in a simplified manner to facilitate the description of the structure of the invention, and the detailed configuration of the control unit, for example, and the main body of the flying vehicle are omitted.

The rotary wing part 12 is connected to the flying vehicle 100 in a tiltable manner. In vertical takeoff, hovering, and vertical landing modes, the rotary axis 40 of the rotary wing faces upward for descent, and in cruise mode, the rotary axis 40 of the rotary wing is tilted forward for horizontal propulsion from the vertical landing mode. The flying vehicle 100 should be equipped with energy (e.g., secondary batteries, fuel cells, fossil fuel, etc.) to operate the plurality of rotary wing parts 12.

The main wing 20 is capable of generating lift to assist in the flight of the flying vehicle 100. The main wing 20 may also be equipped with moving blades, if necessary.

The landing legs 30 have a ground contact area that makes contact with the ground and may also be equipped with dampers or other devices that provide shock mitigation when landing or placing the flying vehicle.

The flying vehicle 100 has the direction of arrow D in the figure (−Y direction) as the forward direction and arrow E as the downward direction (−Z direction) (see below for details).

In the following explanation, the terms may be used according to the following definitions. Forward and backward: +Y direction and −Y direction, up and down (or vertical): +Z direction and −Z direction, left and right (or horizontal): +X direction and −X direction, traveling direction (forward): −Y direction, reverse direction (backward): +Y direction, up (upward): +Z direction, down (downward): −Z direction Propellers 10-10d rotate under the output from motors 11-11d. The rotation of propeller 10 generates the propulsive force to take the flying vehicle 100 off from its starting point, move it, and land it at its destination. The propeller 10 can rotate to the right, stop, and rotate to the left.

The propeller 10 provided by the flying vehicle 100 of the current invention has one or more blades. Any number of blades (rotors) (e.g., 1, 2, 3, 4, or more blades) is acceptable. The shape of the blades can be any shape, such as flat, curved, kinked, tapered, or a combination thereof. The shape of the blades can be changeable (e.g., stretched, folded, bent, etc.). The blades can be symmetrical (having identical upper and lower surfaces) or asymmetrical (having differently shaped upper and lower surfaces). The blades can be formed into airfoils, wings, or any geometry suitable for generating dynamic aerodynamic forces (e.g., lift, thrust) when the blades are moved through the air. The geometry of the vane can be selected as appropriate to optimize the dynamic aerodynamic characteristics of the vane, such as increasing lift and thrust and reducing drag.

The propeller provided by the flying vehicle of the present invention may be, but is not limited to, fixed pitch, variable pitch, or a mixture of fixed and variable pitch propellers.

Motors 11a-11d produce rotation of propellers 10-10d. For example, the drive unit can include an electric motor or engine, or the like. The blades can be driven by the motor and rotate around the axis of rotation of the motor (e.g., the long axis of the motor).

The blades can all rotate in the same direction or can rotate independently. Some of the blades rotate in one direction while others rotate in the other direction. The blades can all rotate at the same RPM, or they can each rotate at a different RPM. The number of rotations can be determined automatically or manually based on the dimensions of the moving object (e.g., size, weight) and control conditions (speed, direction of movement, etc.).

The flying vehicle 100 determines the number of revolutions of each motor and the angle of flight according to the wind speed and direction by means of a flight controller or radio/propo, or the like. This allows the flying vehicle to move up and down, accelerate and decelerate, and change direction.

The flying vehicle 100 can fly autonomously according to routes and rules set in advance or during the flight, or by using a radio/propo to control the flying vehicle.

Figure 2:
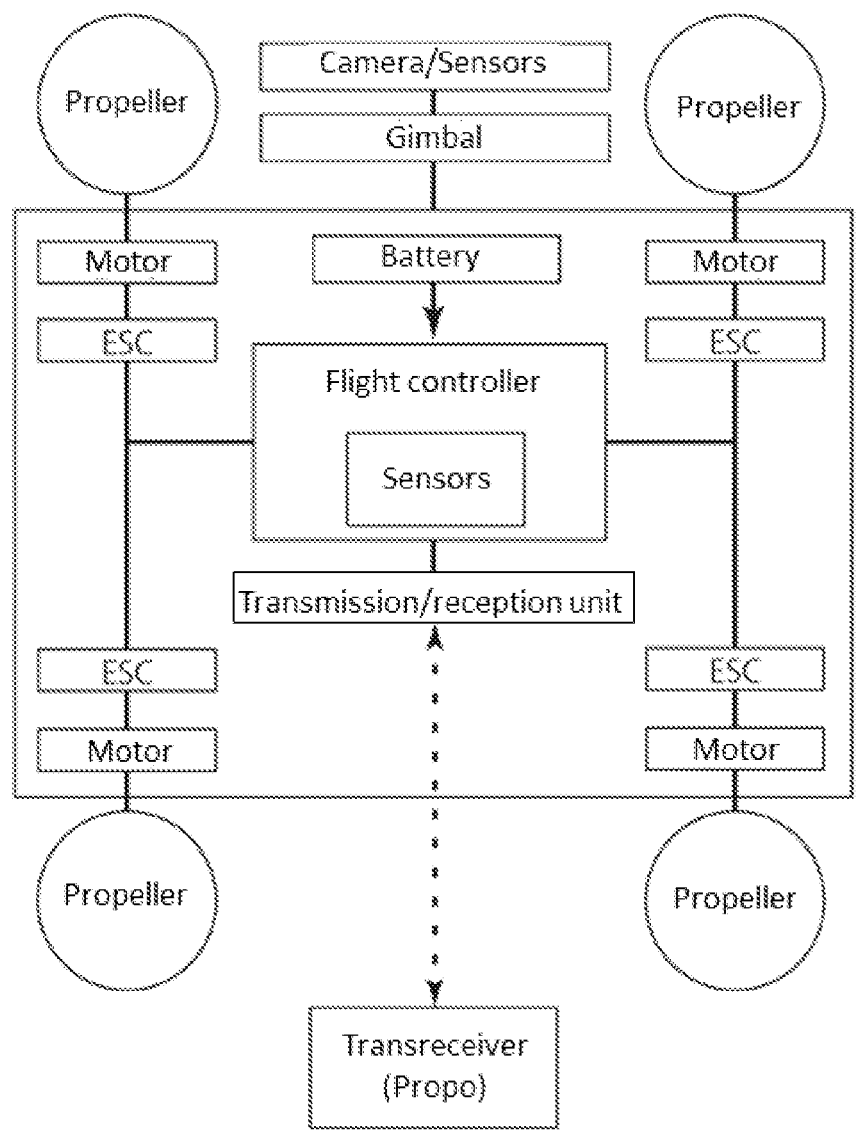
FIG. 2 is a functional block diagram of the flying vehicle according to the present invention.

The flying vehicle 100 described above has the functional blocks shown in FIG. 2. The functional blocks in FIG. 2 are a minimum reference configuration. The flight controller is a so-called processing unit. The processing unit can have one or more processors, such as a programmable processor (e.g., central processing unit (CPU)). The processing unit has a memory, not shown, which is accessible. The memory stores logic, code, and/or program instructions that can be executed by the processing unit to perform one or more steps. The memory may include, for example, a separable medium such as an SD card, random access memory (RAM), or an external storage device. Data acquired from a cameras and a sensor may be directly transmitted to and stored in the memory. For example, still and moving image data captured by a camera or other device is recorded in the internal or external memory.

The processing unit includes a control module configured to control the state of the rotorcraft. For example, the control module controls the propulsion mechanism (e.g., motor) of the rotorcraft to adjust the spatial arrangement, velocity, and/or acceleration of the rotorcraft having six degrees of freedom (translational motion x, y and z, and rotational motion θx, θy and θz). The control module can control one or more of the states of the mounting part and sensors.

The processing unit is capable of communicating with a transmitter/receiver configured to transmit and/or receive data from one or more external devices (e.g., terminals, display units, or other remote controllers). The transmitter/reception unit can use any suitable means of communication, such as wired or wireless communication. For example, the transmitter/reception unit can use one or more of the following: local area network (LAN), wide area network (WAN), infrared, wireless, WiFi, point-to-point (P2P) network, telecommunications network, or cloud communications. The transmitter/reception unit can transmit and/or receive one or more of the following: data acquired by sensors, processing results generated by the processing unit, predetermined control data, and user commands from a terminal or remote controller.

Sensors in this embodiment can include inertial sensors (accelerometers, gyro sensors), a GPS sensor, a proximity sensor (e.g., LIDAR), or a vision/image sensor (e.g., a camera).

As illustrated in FIG. 1, the flying vehicle 100 in the present invention can be expected to improve fuel efficiency during cruise mode by utilizing not only the propulsive force generated by the rotary wing part 12 but also the lift force generated by the main wing 20.

Figure 25:
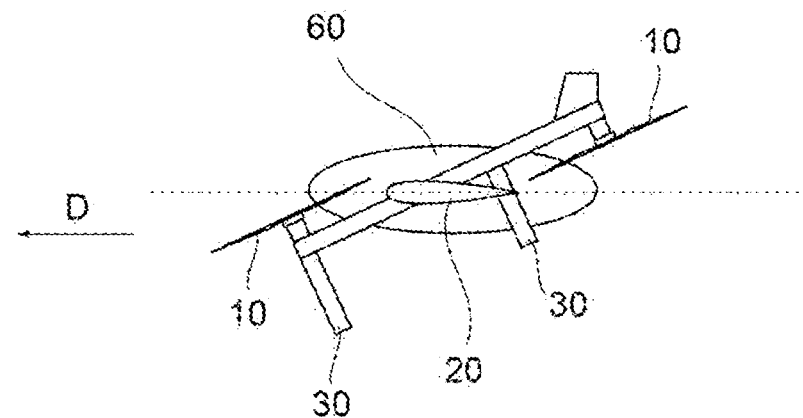
FIG. 25 is a side view of a conventional aircraft in cruising mode.
Figure 25:
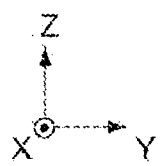
Figure 26:
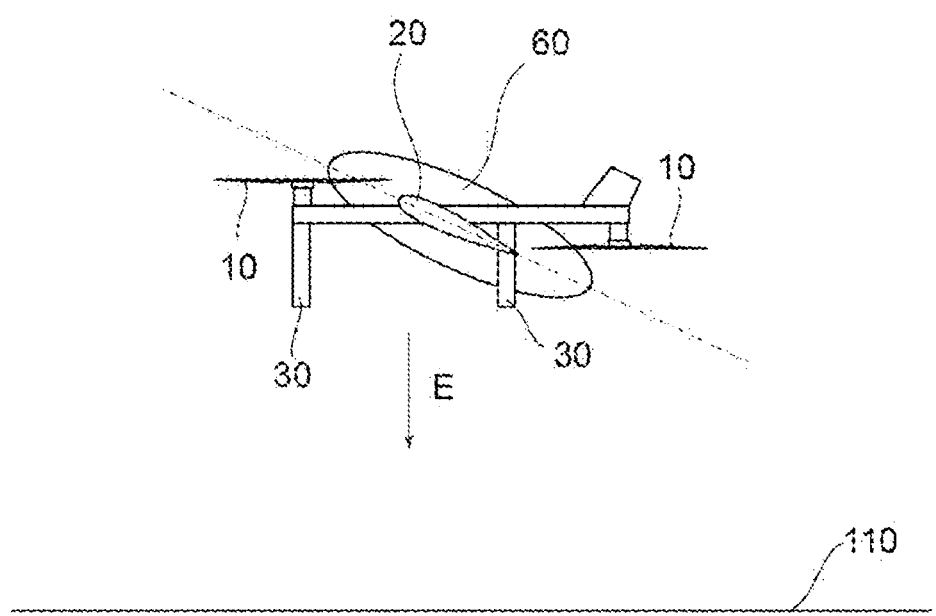
FIG. 26 is a side view of the aircraft of FIG. 25 when it is landing.
Figure 27:
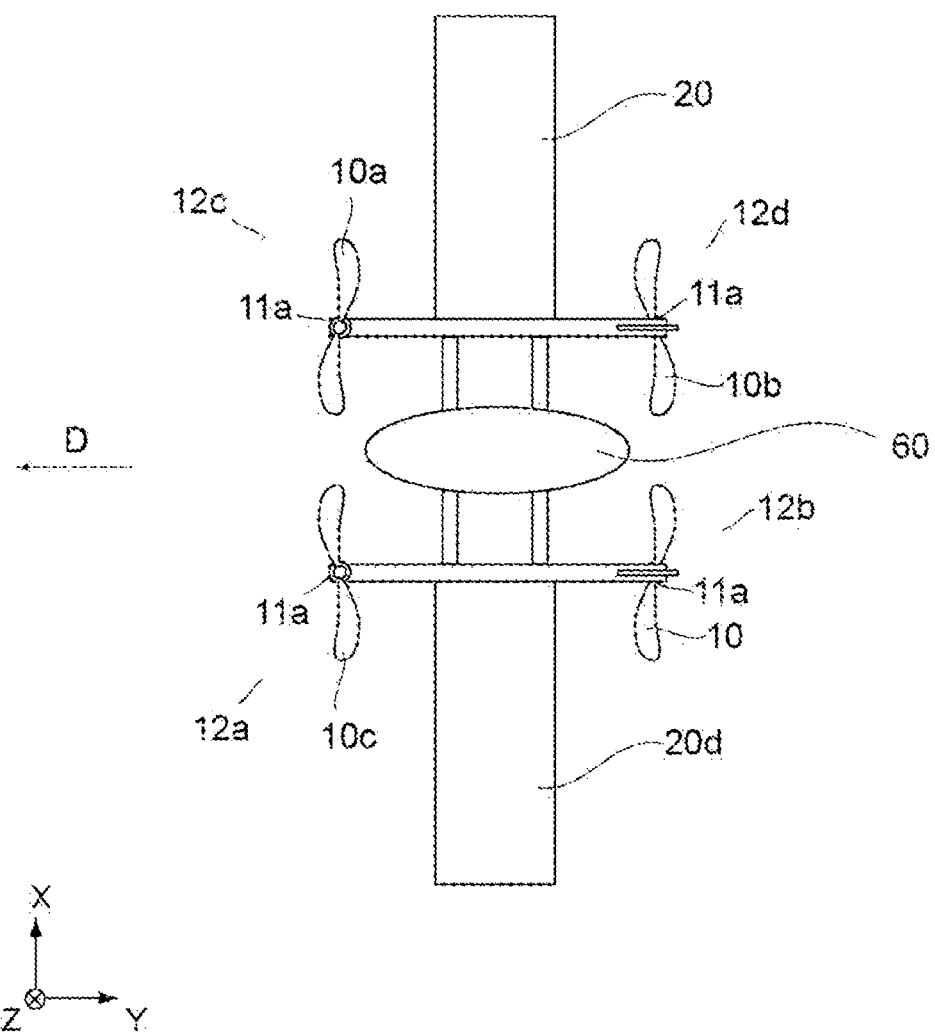
FIG. 27 is a top view of the aircraft of FIG. 25 when it is landing.

Here, the conventional aircraft is explained again. Comparing the attitude of the main wing 20 in cruise mode as shown in FIG. 25 and the attitude of the main wing 20 in landing mode as shown in FIG. 26, the positive angle of attack of the main wing 20 is larger in the landing mode.

As the positive angle of attack increases, the lift produced by the wing 20 increases until it reaches the stall angle of attack. Therefore, in a flying vehicle configuration such as a conventional aircraft, where the wing 20 in landing mode generates more lift than in cruise mode, landing may take longer or be more difficult, or the aircraft may lift off the ground in strong winds. Especially in cases where efficiency-oriented operation is desired, such as in the home delivery business, the increased time required for landing is a disadvantage.

Since the wing 20 does not generate lift when there is no airflow, it is unlikely that the lift generated by the wing 20 will affect the landing when there is no wind or light wind, but it is difficult to always have no wind or light wind in the actual flying vehicle landing environment.

In the flying vehicle 100 according to the present invention, the lift force generated by the main wing 20 in the landing mode is designed to be less than the lift force generated by the main wing 20 in horizontal flight in order to enable stable landing even in an environment affected by wind such as outdoors, and also to enable landing in strong winds, which are difficult for conventional aircraft to land.

Figure 3:
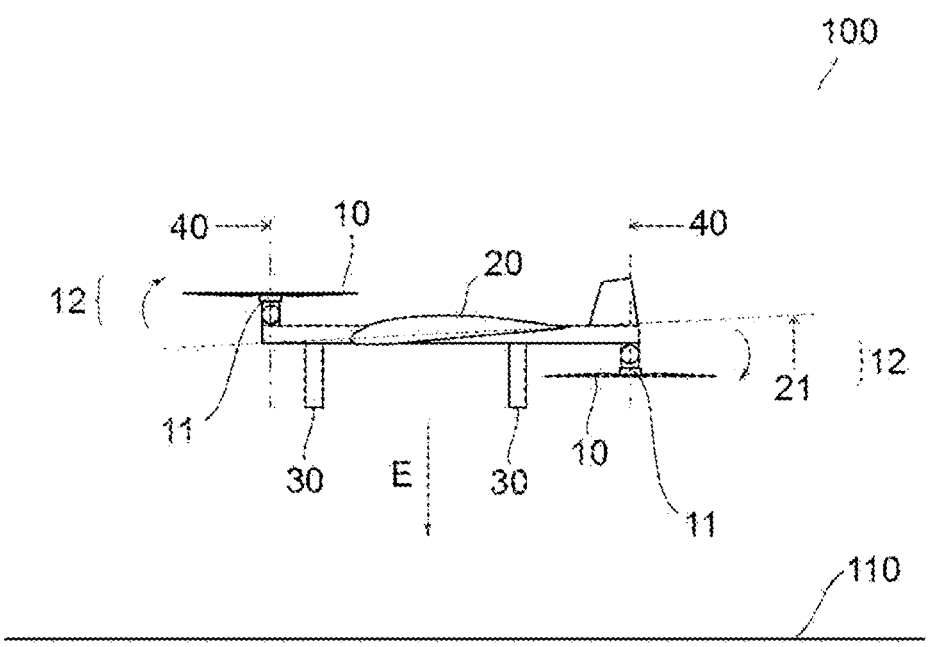
FIG. 3 is a side view of the flying vehicle shown in FIG. 1 in landing mode.

As illustrated in FIG. 1 and FIG. 3, in the first embodiment, the angle of attack 21 of the main wing in landing mode is fixed to the flight part at an angle of negative inclination in landing mode than cruise mode, in order to reduce the lift produced by the main wing 20 in vertical landing compared to the lift produced by the main wing 20 in cruise mode.

Figure 4:
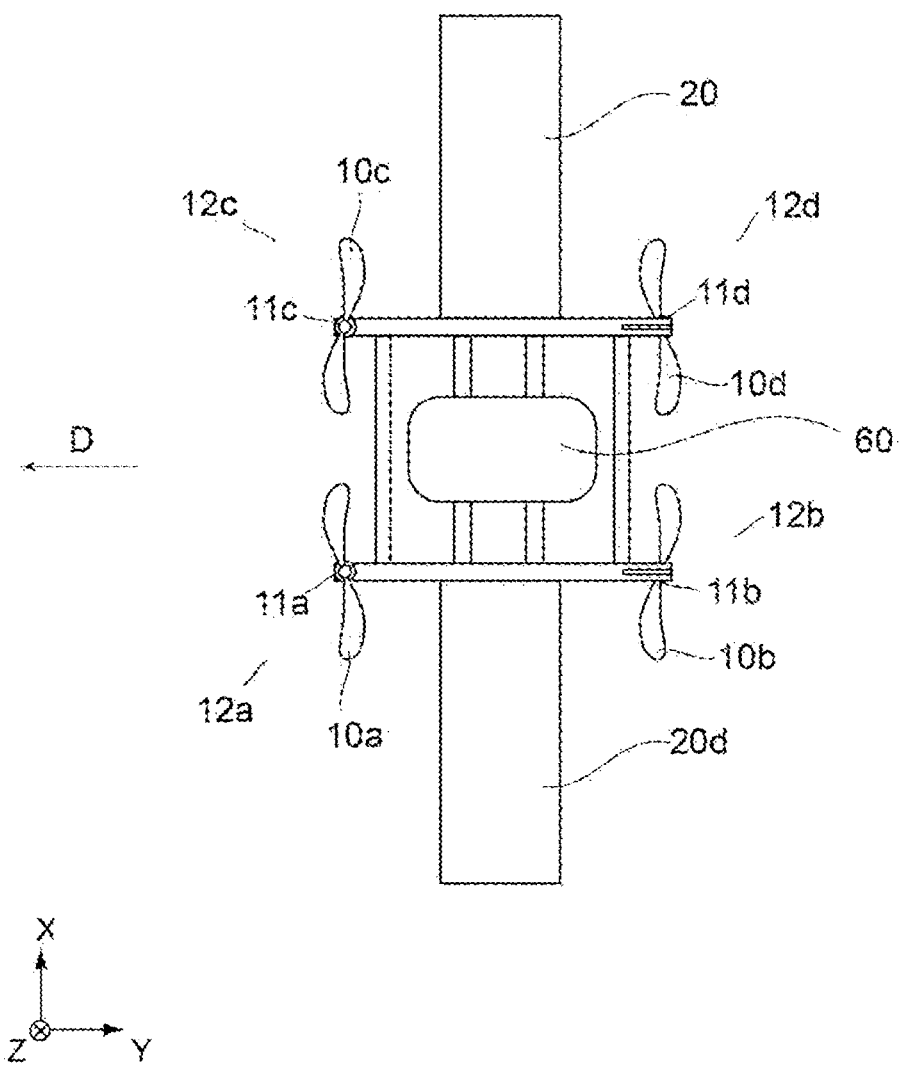
FIG. 4 is a top view of the flying vehicle of FIG. 1 in landing mode.
Figure 5:
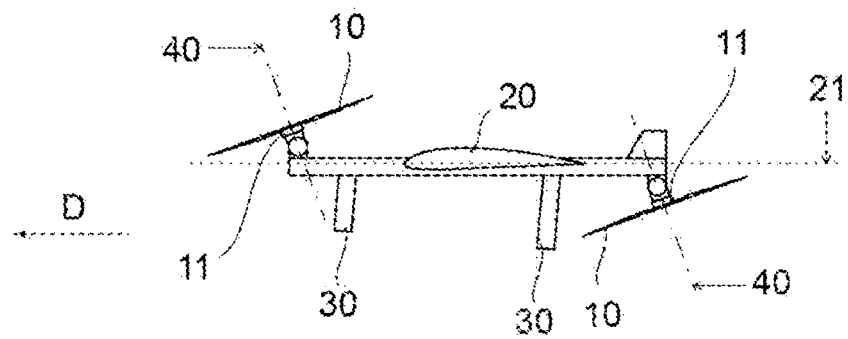
FIG. 5 is a side view of the flying vehicle according to the present invention in cruise mode.
Figure 5:
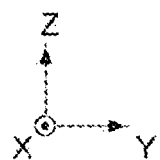
Figure 6:
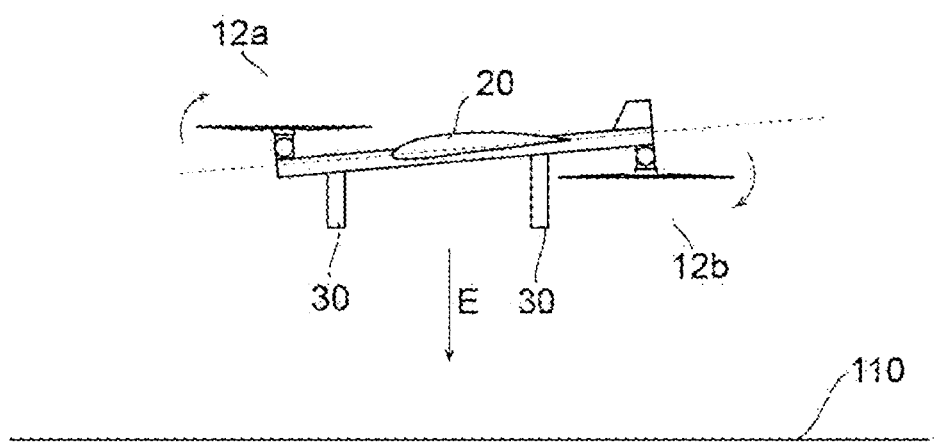
FIG. 6 is a side view of the flying vehicle of FIG. 5 in landing mode.

In the above configuration, the tilt angle of the rotary wing part 12 must be set to a predetermined angle so that the angle of the rotary axis 40 of the rotary wing in cruise mode is at an appropriate angle. For example, the tilt angle of the rotary wing part 12 in FIGS. 5 and 6 is 25 degrees, and the tilt angle of the rotary wing part 12 in FIGS. 1 and 3-4 is 90 degrees. However, if the angle of the rotary axis 40 in cruise mode needs to be closer to horizontal in the flying vehicle 100 with the main wing 20 at the same angle on the flight part, the required tilt angle will increase.

Figure 7:
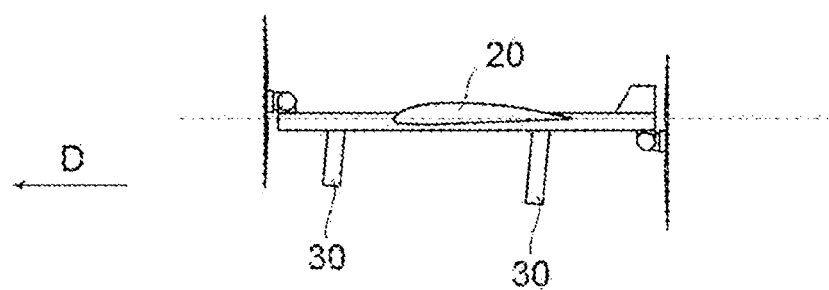
FIG. 7 is a side view of the example configuration of the flying vehicle according to the present invention in cruise mode.
Figure 8:
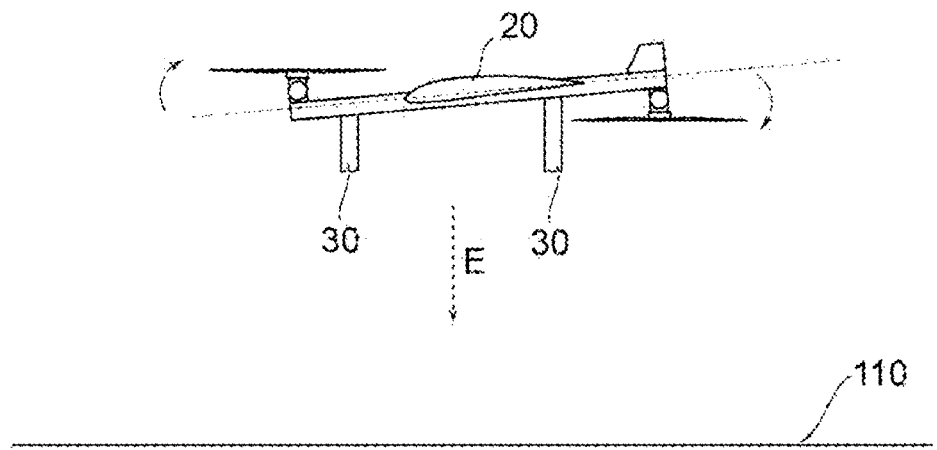
FIG. 8 is a side view of the flying vehicle of FIG. 7 in landing mode.

For example, as shown in FIGS. 7 and 8, in cruise mode, when the rotary wing is used only for propulsion with the axis of rotation 40 roughly horizontal and the lift required for flight is obtained by the main wing 20, the power of the rotary wing is not used to keep the airframe in the air, and therefore, fuel consumption is expected to be improved compared to the case where the rotary wing is used at the tilt of the rotary axis as shown in FIGS. 1 and 5. In a configuration where the rotary wing is used only for propulsion, if the rotary axis 40 is set to be roughly vertically upward during the landing mode and the angle of attack of the main wing 20 is set to be more negative than in the cruise mode, the tilt angle will be an angle greater than 90 degrees.

Figure 9:
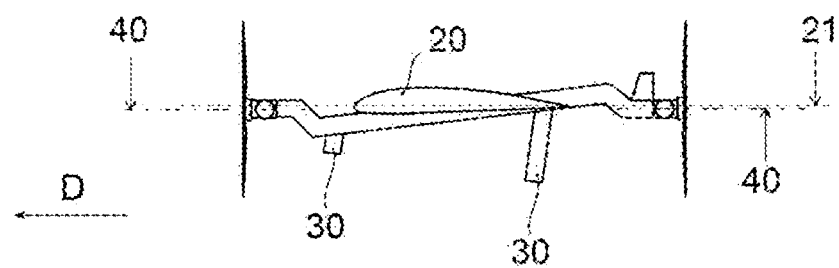
FIG. 9 is a side view of an example configuration of a flying vehicle according to the present invention in cruise mode.
Figure 10:
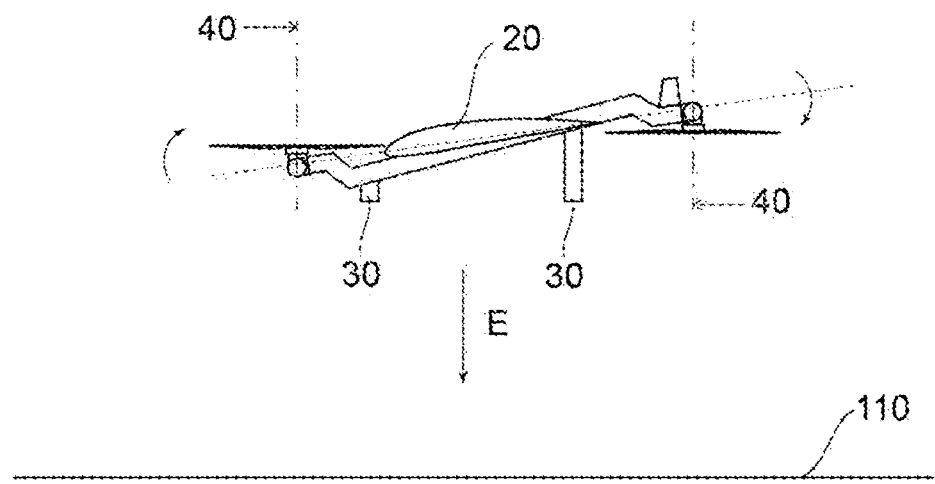
FIG. 10 is a side view of the flying vehicle of FIG. 9 in landing mode.
Figure 11:
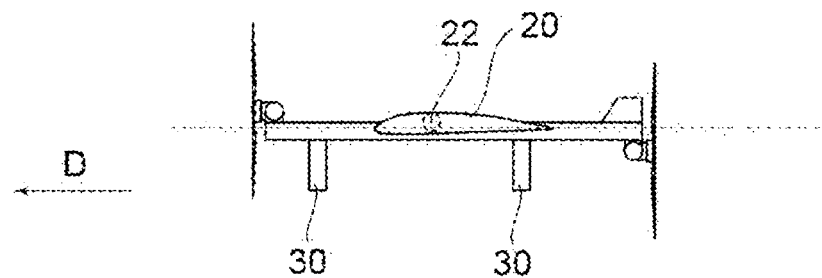
FIG. 11 is a side view of the example configuration of the flying vehicle according to the present invention in cruise mode.
Figure 12:
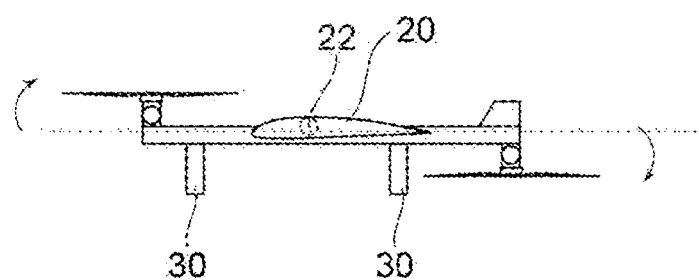
FIG. 12 is a side view of the flying vehicle of FIG. 11 when the rotor wing part transitions to landing mode.
Figure 13:
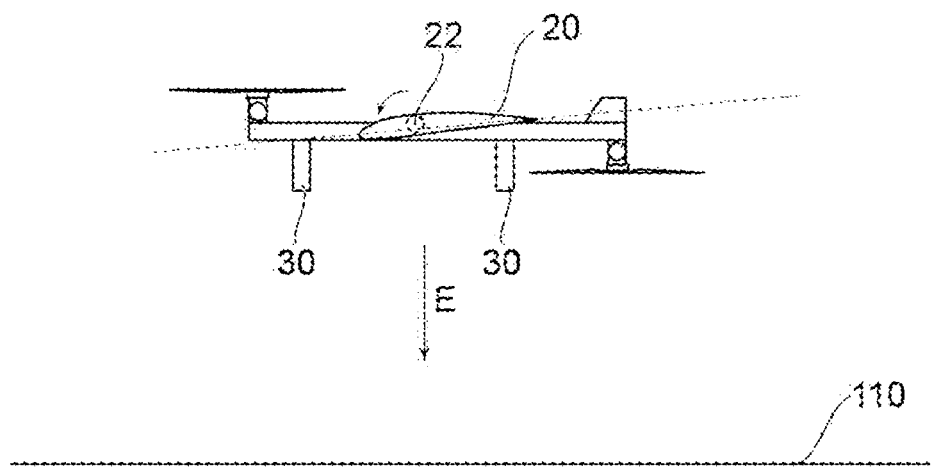
FIG. 13 is a side view of the flying vehicle of FIG. 11 in landing mode.
Figure 14:
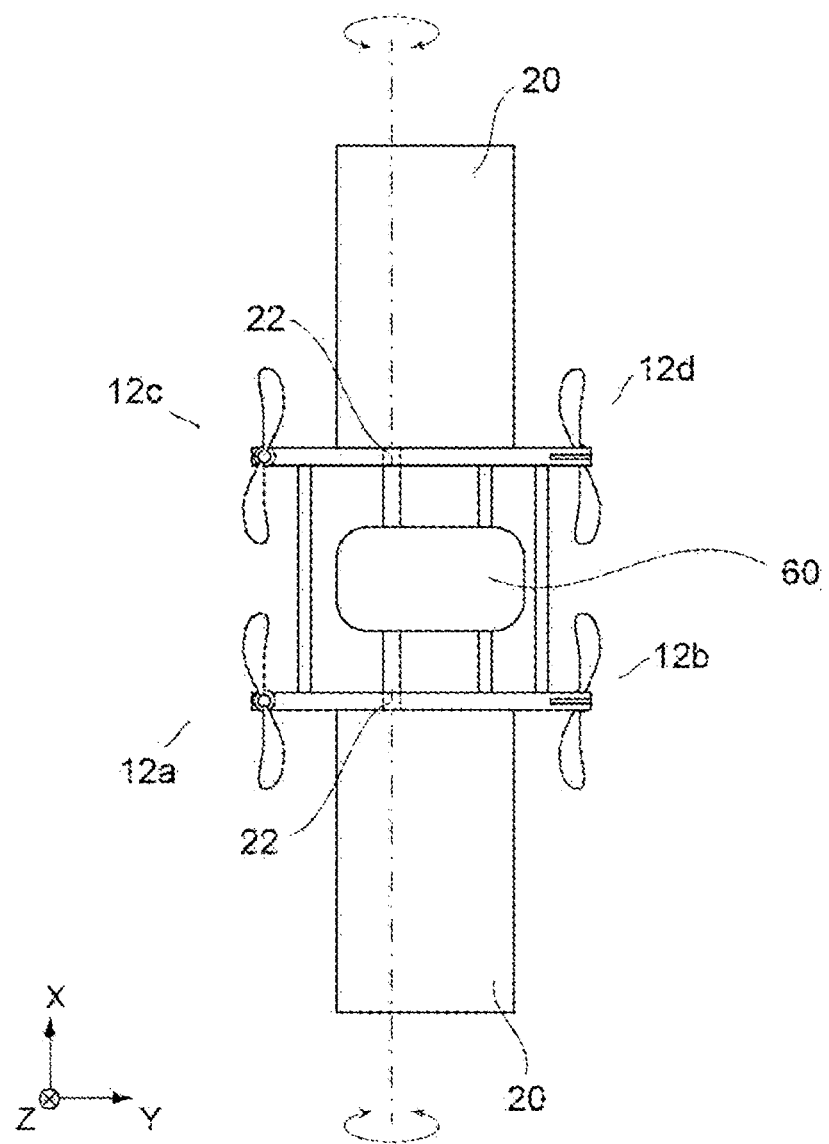
FIG. 14 is a top view of the flying vehicle of FIG. 11 in landing mode.

As shown in FIGS. 9 and 10, the shape of the propeller 10 may avoid interfering with the main wings, etc. The rotary wing part 12 provided by the flying vehicle 100 may cause the propeller 10 to interfere with the frame, arm, main wing, or the like in cruise mode and in landing mode, depending on its installation position and the tilt angle when it is displaced to landing mode. To avoid this, for example, the frame or arm may be bent (bent, curved, etc.), for example, as shown in FIGS. 9 and 10, with a portion of the frame or arm shifted to the installation side of the propeller 10. The motor mount (not shown) may also be raised for the same purpose.

Details of the Second Embodiment

In the details of the second embodiment of this invention, components that overlap with the first embodiment operate in the same way, so they will not be described repeatedly.

As shown in FIGS. 11-14, the wing 20 provided by the flying vehicle 100 according to the second embodiment may displace the angle of connection with the flight part in the direction of negative angle of attack to reduce the lift produced by the wing 20 during landing mode.

The angle of attack 21 of the main wing can be changed by providing a pivoting shaft 22 at the connection between the main wing 20 and the flight part. The turning shaft 22 should be strong enough to withstand flight and takeoff/landing, and should be lightweight. For example, shafts, pipes, and bearings made of plastic, metal. FRP, or the like may be selected for use. These materials may be the same material as the frame and the arm included in the flight part, or they may be different materials.

Figure 15:
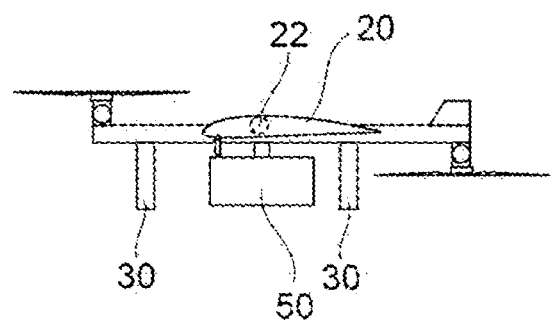
FIG. 15 is a side view of the rotary wing part of the flying vehicle in transition to landing mode.
Figure 15:
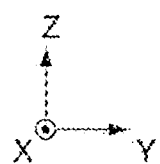
Figure 16:
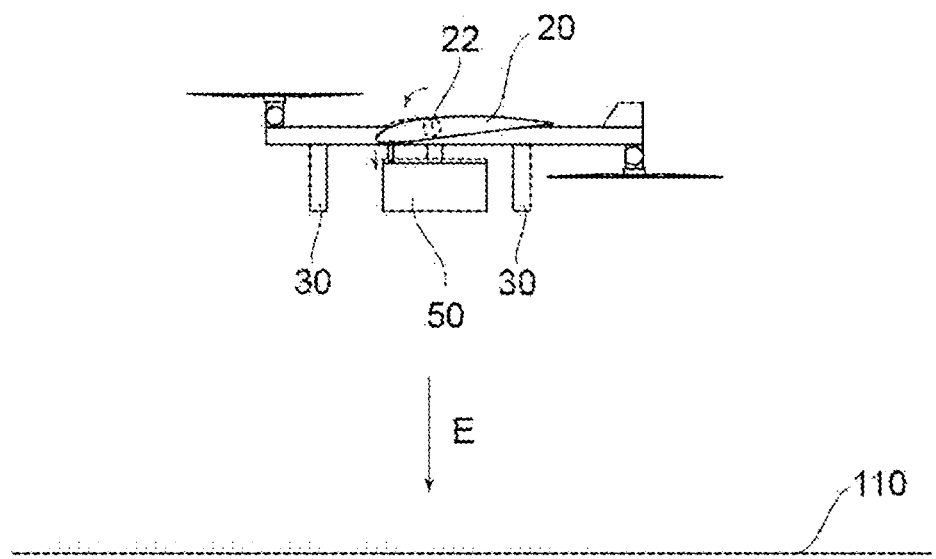
FIG. 16 is a side view of the flying vehicle of FIG. 13 in landing mode.

When shifting to the landing mode and changing the angle of the main wing 20, one method is to use a servo, motor, gas, spring, or the dead weight of the payload 50 to rotate it to a predetermined angle. The payload 50 should be made of objects to be transported, batteries to be used in flight, etc., to minimize the increase in weight. As shown in FIG. 15-FIG. 16, the angle of attack 21 of the main wing 20 is changed by lowering the payload 50 with the payload 50 and a portion of the main wing 20 connected.

In cases where the flying vehicle is used for takeoff or flight again after landing without maintenance, etc., the angle of the main wing 20 should be controllable to switch to the angle of the landing mode and then back to the angle of the cruise mode again. For example, when the flying vehicle is used in a business such as home delivery and travels to multiple delivery destinations in one flight, it is necessary to switch between cruise mode and landing mode multiple times.

However, in cases where the main wing 20 changed to the landing mode can be manually returned to the angle of attack 21 of the main wing 20 in the cruise mode before flying again after landing, it is desirable to have a configuration in which the fixing of the main wing 20 can be released so that the action of returning the main wing 20 to the cruise mode again, once changed to the landing mode angle, can be done by human hands or maintenance robots or other external means. This is expected to simplify the mechanism and reduce the weight of the flying vehicle 100.

Figure 17:
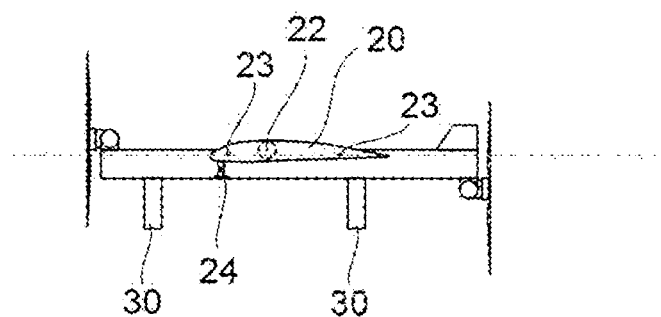
FIG. 17 is a side view of the example configuration of the flying vehicle according to the present invention in cruise mode.
Figure 18:
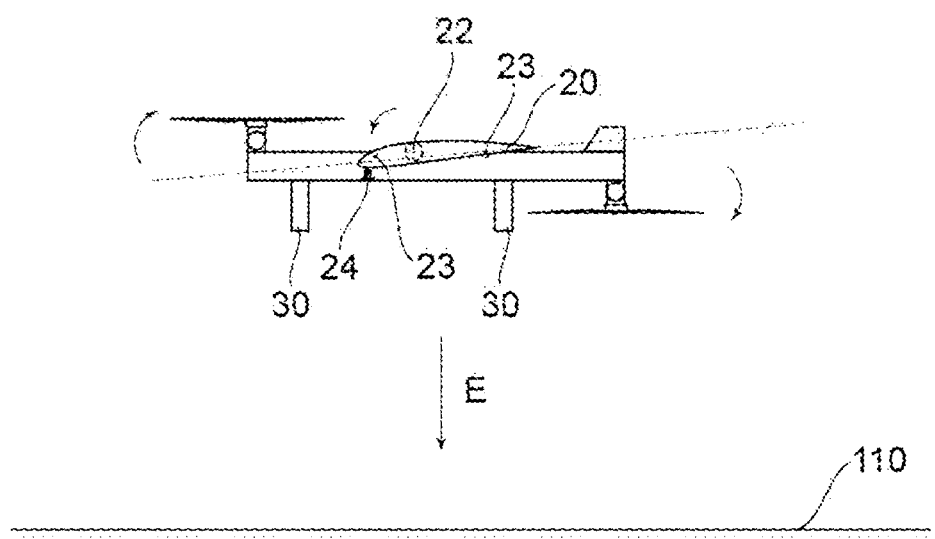
FIG. 18 is a side view of the flying vehicle of FIG. 17 in landing mode.

For example, as shown in FIGS. 17 and 18, the main wing 20 is connected to the flight part via the rotary shaft 22, and the main wing 20 is always pulled to be at the angle of attack in landing mode by the force of a tension spring 24 attached to connect the front side of the wing 20 with the lower part of the flight part. In cruise mode, the main wing is held in posture by a support member 23 such as pins or the like against the force of the spring 24, so that the angle of attack is not tilted in a negative direction above a predetermined angle. When switching from the cruise mode to the landing mode, the pin 23 is removed from the main wing 20 by a servo or other means, and the angle of attack of the main wing 20 changes to a negative angle of attack in accordance with the force of the spring 24.

The mechanism that displaces the angle of connection of the main wing 20 with the flying part in the direction of negative angle of attack, in addition to stabilizing the landing of the flying vehicle during normal times, also makes it possible to limit the crash range or make an emergency landing in the event of a flying vehicle 100 failure, for example.

VTOL aircraft equipped with a main wing that can generate lift have the advantage of improved fuel efficiency by utilizing the lift generated by the wing. On the other hand, it can be difficult to limit the location of a crash because the aircraft will continue to glide forward even if a rotary wing stop rotating when the flying vehicle is disabled.

In the emergency crash mode, the angle of attack of the main wing 20 in flight is set to an angle of attack even more negative than the zero lift angle to actively stall the flying vehicle 100, thereby rapidly lowering its altitude and forcing it to crash. For example, if the point where the flying vehicle 100 has experienced an anomaly is a suitable location for an emergency crash site (e.g., an area with no human habitation or on water), it is important to crash the flying vehicle on the spot more quickly before the aircraft moves over human habitation or to a location where the damage from the flying vehicle's fall would be extensive.

Conversely, if it is difficult to crash the flying vehicle at the point where the abnormality occurred, it is possible to prevent damage from the flying vehicle falling by leaving the site by gliding with the main wing 20 and switching to the emergency crash mode above a suitable point for the fall. In addition, when the flying vehicle falls, it is possible to further reduce the impact on the point of fall by using a parachute or other means to reduce the speed of the fall.

If the negative or positive angle of attack of the main wing is increased to an angle that exceeds the stall angle during the emergency landing mode, the flying vehicle is expected to enter a stall and also reduce its flight speed due to the increased drag of the main wing 20.

For example, if an airfoil that stalls at a wing angle of attack of −10 degrees is used, (the wing angle of attack is +5 degrees in cruise mode. 0 degrees in crash mode), in emergency crash mode, by setting the angle to about −20 degrees, it will allow a quick stall, crash and fall.

Details of the Third Embodiment

In the details of the third embodiment, components that overlap with the first embodiment operate in the same way, so they will not be described repeatedly.

Figure 19:
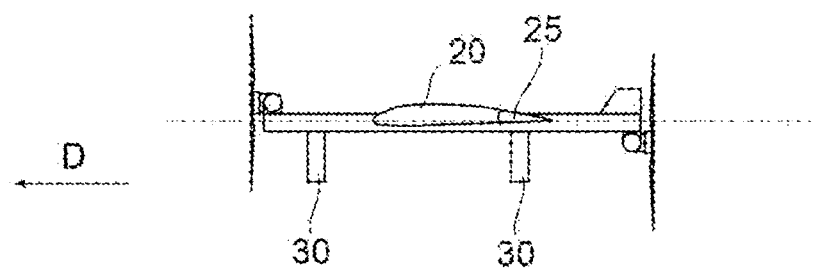
FIG. 19 is a side view of the example configuration of the flying vehicle according to the present invention in cruise mode.
Figure 20:
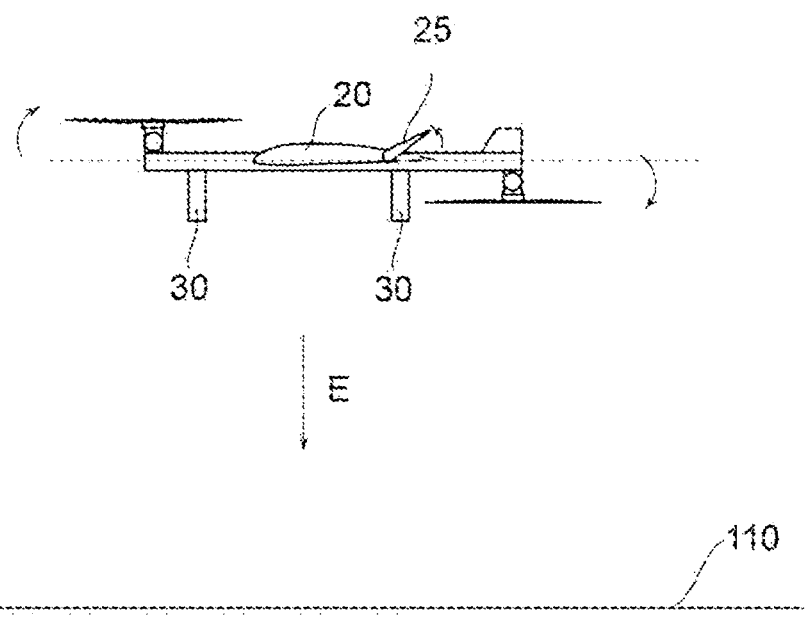
FIG. 20 is a side view of the flying vehicle of FIG. 19 in landing mode.

As shown in FIGS. 19 and 20, the main wing 20 provided by the flying vehicle 100 in the third embodiment has a moving surface 25 as a mechanism for reducing lift, and the moving surface 25 can move to reduce the lift generated by the main wing 20.

Generally, vertical landing crafts (e.g., Harrier, F-35B, etc.) that fly with fixed wings equipped with dynamic wings deploy flaps (high-lift devices), etc., lower than in cruise mode in order to obtain more lift in landing mode. However, the flying vehicle 100 according to the present invention is configured to make a stable landing by reducing the lift obtained during the landing mode, so the moving surface 25 is deployed higher than in the cruise mode to obtain the effect of reducing the lift produced by the main wing 20.

When the lift is changed by the deployment of the moving surface 25, the drag force is also increased as a side effect. However, the increase in drag force causes the flying vehicle 100 to be swept away by the headwind and reduces the accuracy of the landing, so it is preferable to use a configuration with a small increase in drag force. Therefore, the design should take into account the balance between the reduction in lift and the increase in drag.

Figure 21:
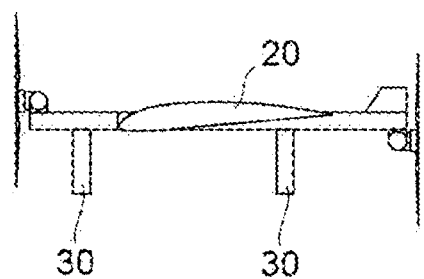
FIG. 21 is a side view of the example configuration of the flying vehicle according to the present invention in cruise mode.
Figure 22:
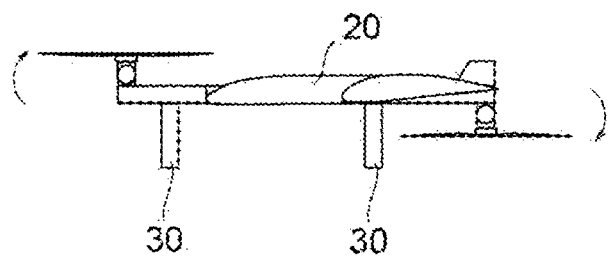
FIG. 22 is a side view of the flying vehicle of FIG. 21 in landing mode.
Figure 23:
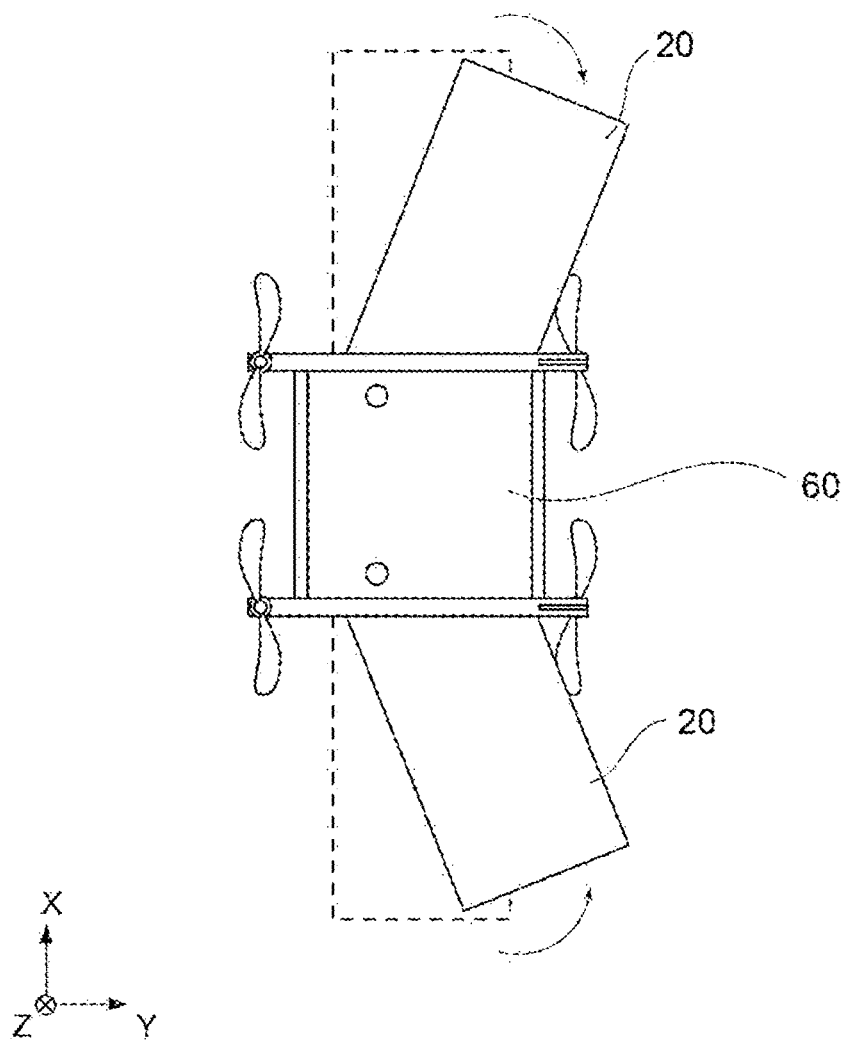
FIG. 23 is a top view of the flying vehicle of FIG. 21 in landing mode.
Figure 24:
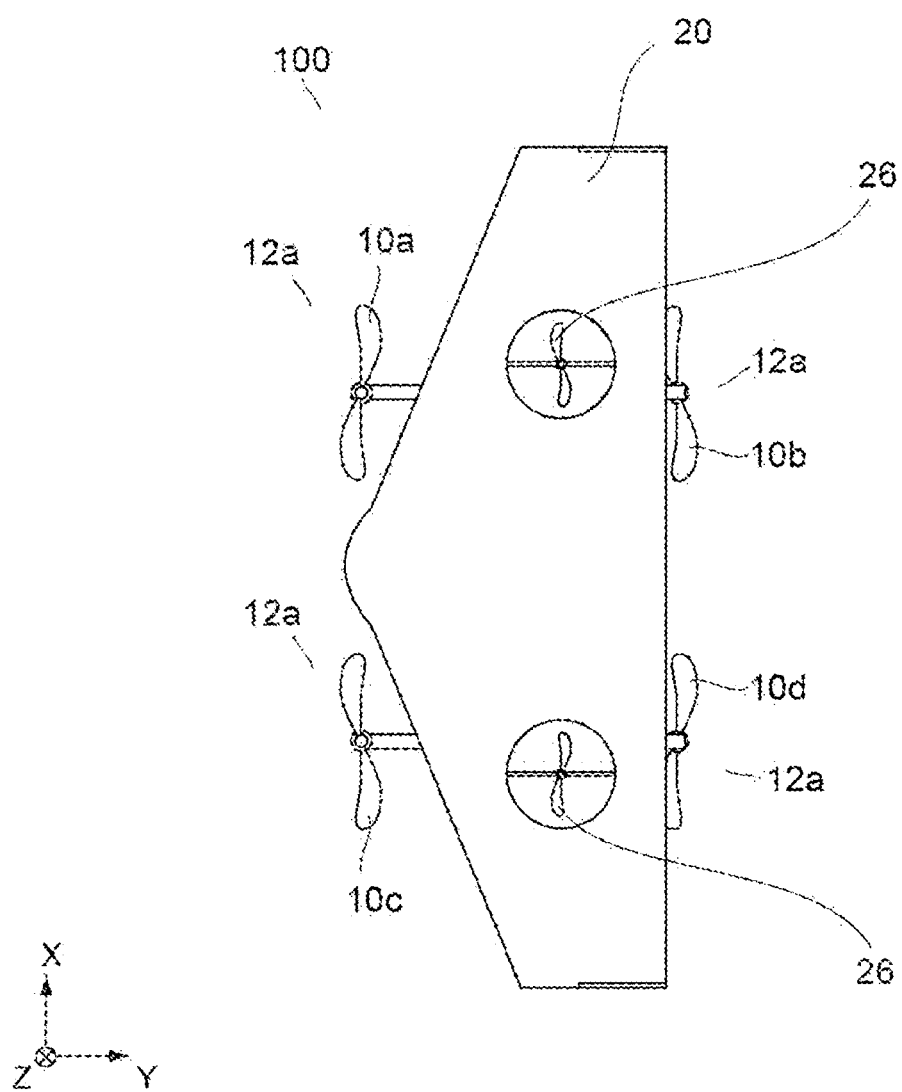
FIG. 24 is a top view of the example configuration of the flying vehicle according to the present invention in the landing mode.

One way to reduce the lift generated by the main wing while minimizing the increase in drag is to deform the main wing 20 using a variable retractable or variable forward blade mechanism, as shown in FIGS. 21-23, or to install a mechanism in the main wing 20 that generates an upward wake, such as a fan 26, as shown in FIG. 24, and to rotate the fan 26 during the landing mode. The fan 26 can be rotated during the landing mode.

The above-mentioned configurations of flying vehicles in each of the above forms can be implemented by combining several of them. It is desirable to consider the appropriate configuration according to the cost of manufacturing the flying vehicle and the environment and characteristics of the location where the flying vehicle will be operated.

The above-described embodiments are merely examples to facilitate understanding of the invention and are not intended to be construed as limiting the invention. It goes without saying that the invention may be changed and improved without departing from its purpose, and that the invention includes its equivalents.

DESCRIPTION OF REFERENCE NUMERALS

10a~10d Propeller
11a~11d Motor
20 Main Wing
21 Angle of attack of the main wing
22 Rotary axis of the main wing
23 Support member
24 Spring
25 Moving surface
26 Fan
30 Landing legs
50 Payload
60 Main body part
100 Flying vehicle
110 Landing surface

The invention claimed is:

1. A flying vehicle, comprising:
a flying part including a plurality of rotary wing parts and a main body part, each of the rotary wing parts including a motor and a rotary wing;
a main wing connected to the flying part; and
wherein the main wing is configured so that a lift generated by the main wing during landing is reduced compared to the lift generated by the main wing during cruise,
wherein the main wing is connected to the flying part via a rotary shaft,
wherein the main wing is configured to tilt forward about the rotary shaft at an angle relative to the flying part when landing more than when cruising,
wherein the main wing is further connected to the flying part via a support member and a spring,
wherein the spring is configured to cause the main wing to tilt forward about the rotary shaft at an angle relative to the flying part when landing more than when cruising, by releasing the support member.

2. The flying vehicle according to claim 1, wherein the main wing is configured to tilt forward or backward at an angle of attack that results in a stall in the event of an emergency crash.

3. The flying vehicle according to claim 1, wherein the flying vehicle is further provided with means to reduce the operating rate of fall in the event of an emergency crash.

4. The flying vehicle according to claim 1, wherein the main wing is further equipped with an additional moving surface that deploys above the main wing during landing.

5. The flying vehicle according to claim 1, wherein the flying vehicle is further equipped with a fan that produces an upward wake during landing.

* * * * *